US005671160A

United States Patent [19]
Julian

[11] Patent Number: 5,671,160
[45] Date of Patent: Sep. 23, 1997

[54] POSITION SENSING SYSTEM

[75] Inventor: Charles F. Julian, Holly, Mich.

[73] Assignee: GCS Properties, Waterford, Mich.

[21] Appl. No.: 465,254

[22] Filed: Jun. 5, 1995

[51] Int. Cl.⁶ .................. G01C 3/00; G01C 5/00
[52] U.S. Cl. .................. 364/559; 364/505; 33/293
[58] Field of Search .................. 364/559, 443, 364/444, 449, 420, 453, 460, 505, 561; 250/559.38, 559, 29, 559.37; 33/293, 318, 320, 321; 356/139.03, 375

[56] References Cited

U.S. PATENT DOCUMENTS

| | | |
|---|---|---|
| 3,633,280 | 1/1972 | Lichte et al. . |
| 4,717,251 | 1/1988 | Wells et al. . |
| 4,820,041 | 4/1989 | Davidson et al. . |
| 4,920,655 | 5/1990 | Van Steenwyk .................. 33/304 |
| 4,926,050 | 5/1990 | Shemwell .................. 250/560 |
| 5,052,645 | 10/1991 | Hixon . |
| 5,313,409 | 5/1994 | Wiklund et al. . |

*Primary Examiner*—Emanuel T. Voeltz
*Assistant Examiner*—M. Kemper
*Attorney, Agent, or Firm*—Weintraub DuRoss & Brady

[57] ABSTRACT

A system for three-dimensional position sensing including a target station, a reference station and a means for accurately calculating the position of the target station relative to the reference station. The system includes the use of at least one gyroscope and a computer to determine the position of the target station. Such a system may be used in land surveying, earth grading machinery position sensing, marine navigation and coordinate measuring.

20 Claims, 4 Drawing Sheets

POSITION SENSING SYSTEM

BACKGROUND OF THE INVENTION

1. Field of the Invention

The present invention relates generally to position sensing systems. More particularly, the present invention provides a gyroscopically corrected position sensing system for use in surveying, earth grading, and coordinate measuring.

2. Description of the Related Art

According to conventional practice, the process of transforming a tract of land into a graded surface involves several tasks. First the land is surveyed to create a contour map or other graphical representation of the pre-existing state of the land. Second, the land is marked, or staked, to direct earth-moving equipment where to remove or fill-in earth so that the tract of land conforms to the grade necessary to build thereupon. Third, earth-moving machinery grades the land.

Surveying involves the delineation of the form, extent, and position of the tract of land based on linear and angular measurements of the land. According to conventional practice, surveying is at least a two person job, with one person operating a measuring instrument from a generally stationary position and the other person transporting and positioning a grade rod, or other target, to be sighted by the measuring instrument.

The measuring instrument, such as a transit, or total station, is positioned a known distance and angle from a reference or bench mark position. The target is sequentially statically positioned at one or more locations where it is leveled by the operator to ensure accurate measurements. The target may be placed upon a tripod which includes a bubble measure to ensure that the tripod is not on a slant. At each such location, the distance and angle of the grade rod with respect to the position of the measuring instrument is determined and recorded. Distances may be measured manually with a steel tape or chain, or may be measured optically by the measuring instrument utilizing various means such as a retroreflector on the grade rod.

Currently, robotic transits exist that can automatically track a target (a reflective element) and take measurements of the target's position as the target is moved along the Earth. These robotic transits fail to produce accurate results though, and require the target to be moved quite slowly to take readings. Additionally, if the target is moved up and down an incline, the transit produces highly inaccurate measurements. Angles are typically measured in both horizontal and vertical planes, with an azimuth angle defined as the horizontal angle measured clockwise from North or another bench mark such as a landmark, and a zenith angle defined as the vertical angle measured downward from the vertical. From the distance and angle information obtained in the survey, and through the application of the principles of geometry and trigonometry, the surface of a tract of land can be characterized and presented in graphical form. The task of marking the land can utilize the same surveying apparatus described above. Currently employed marking methods include staking out the surveyed area to guide operators of earth-moving equipment while they grade the land into conformity with the site plan. The process of marking involves first defining on the site plan the coordinates of various key locations to be marked, and then placing stakes on the land at those locations.

The target is positioned near a location to be marked, and its position is determined by the measuring instrument. If the target is not exactly positioned at the location to be marked, the position is noted and the target is repositioned and remeasured until the measuring instrument verifies that the grade rod is positioned at the location to be marked. A stake or other marker is then driven into the ground at that point. Like surveying, the process of marking a tract of land as currently practiced is a task that requires at least two trained people.

After the tract of land has been marked, earth-moving equipment can be used for grading the site. The operators of the earth-moving equipment are guided by the marker stakes in determining where to remove and where to fill in the land. The site may need to be resurveyed during or after completion of the grading to verify the accuracy of the graded surface. With the necessary tasks of surveying, marking, and resurveying, the conventional practice of transforming a tract of land into a graded surface is currently extremely time consuming.

What is needed is a method and apparatus for more rapid and accurate surveying, and grading, of a tract of land, and for more accurate and rapid coordinate measuring of three dimensional objects. It is to the solution of these problems to which the present invention is directed.

SUMMARY OF THE INVENTION

The present invention provides a system for three dimensional position sensing comprising:
  at least one target station;
  at least one reference station comprising:
    (1) means for measuring the distance of the at least one target station from the at least one reference station;
    (2) means for measuring the height of the at least one target station relative to the height of the at least one reference station;
    (3) means for measuring the azimuth angle of the at least one target station;
    (4) means for defining at least one floating point;
    (5) means for measuring rotation of the at least one target station about the at least one floating point;
  means for correcting for tilt of the target station;
  means for calculating the position of the target station; and
  wherein measurements taken by the means for measuring the distance of the at least one target station from the at least one reference station, the means for measuring the height of the at least one target station relative to the height of the at least one reference station, and the means for measuring the horizontal angle (azimuth angle) of rotation of the at least one target station are adjusted by the means for correcting for the tilt of the target station according to measurements taken by the means for measuring the rotation of the at least one target station about the at least one floating point.

A first aspect of the present invention provides a three-dimensional position sensing system utilizing a reference station, a portably positionable target station, at least one gyroscope mounted to the portably positionable target station, means for correcting for tilt of the target station, and means for calculating the relative height, distance, and azimuth angle of the portably positionable target station compared to the reference station or to another benchmark.

Additionally, the present invention encompasses the incorporation of the sensing system hereof into surveying apparatus and a method of use therefor, including grading implement sensing and directing apparatus and methods of use therefor, as well as a coordinate system measuring apparatus.

Additionally, the present invention may be employed to survey not only tracts of land, but also three dimensional objects such as buildings, automobiles, etc.

In the preferred embodiment of the first aspect of the present invention there is included a reference station apparatus. The reference station is designed for use with the portably positionable target station. The reference station preferably includes a robotic transit. A gyroscope is mounted to the reference station. The reference station tracks the position of the portably positioned target station. The target station preferably includes a target pole having a reflector mounted thereto. Additionally, a gyroscope is attached to the target station and is referred to generally as the target gyroscope.

The position of the target station is determined utilizing three sets of data. First, the reference station, which is preferably stationary, generates data regarding the position of the portable target station, i.e. the distance, height, and azimuth angle of the target station. Secondly, the target gyroscope serves as the means for measuring rotation of the at least one target station about a floating point and generates data indicating the position of the target station about the gyroscope attached thereto. The target gyroscope serves to define the floating point because the gyroscope defines a point about which it rotates and the gyroscope is attached to the target station. Therefore, the point defined by the gyroscope moves, or floats, as the target station is moved. A gyroscope mounted to the reference station, the reference gyroscope, generates data which is used in accurately calculating the position of the portable target station.

The target gyroscope measures a change in the rotational position of the target station relative to a starting configuration. Therefore, if the target pole is tilted in any direction, the target gyroscope will register such a change. The reference gyroscope is used because as the Earth rotates, the gyroscopes include this movement as a change in the position of the object they are attached to, such as a target pole or a transit.

The three sets of data are preferably communicated to the means for correcting for tilt of the target station, which may be a programmed computer or other computational device which is electrically connected via cabling to the gyroscopes and to the transit of the reference station. Alternatively, the means for correcting for tilt of the target station may remotely read the information from the gyroscopes and the transit, via radio communication ports provided on the different devices. The means for calculating the position of the target station then calculates the position of the target station relative to the reference station. The means for calculating the position of the target station is preferably a programmed computer and may be the same computer as that which serves as the means for correcting for the tilt of the target station.

Because the target gyroscope measures any misalignment of the target station, the portable target station may be mounted to a vehicle and survey points may be taken as the vehicle drives along the Earth. Any tilt of the target station due to the motion of the vehicle will be corrected by referencing the data from the gyroscope, comparing it to the data generated by the reference station, and calculating the "untilted" position of the target station.

A second aspect of the present invention encompasses a method of surveying and the apparatus used therewith. By attaching the portably positioned target station described herein to a vehicle and driving the vehicle along the ground which is being surveyed, accurate measurements may be taken as to the position of the target station relative to the reference station which is used. By using simple equations explained herein, the position of the target station relative to the reference station and to a fixed point may be determined.

A very similar method is disclosed in a third aspect of the present invention, which is namely a grading implement position sensing and guidance system, apparatus, and method.

The present invention further includes a fourth aspect, a coordinate system measuring apparatus. Coordinate system measuring and land surveying are extremely similar; however, coordinate system measuring is used to survey three-dimensional objects such as automobiles, buildings, etc., and generally requires that the target pole be positioned around corners and above and below objects. To accomplish this task, a specialized target station having an L-shaped target pole is provided. The pole may be rotated in three dimensions, providing it with the positionability to measure around corners and the like. Using the gyroscope attached to the target pole to measure the rotation of the pole, accurate measurements may be made.

For a more complete understanding of the present invention and all its aspects, reference is made to the following detailed description when read in conjunction with the accompanying drawings, in which like reference numbers refer to like parts throughout the several views, in which:

DETAILED DESCRIPTION OF THE PREFERRED EMBODIMENT

Figure 1:
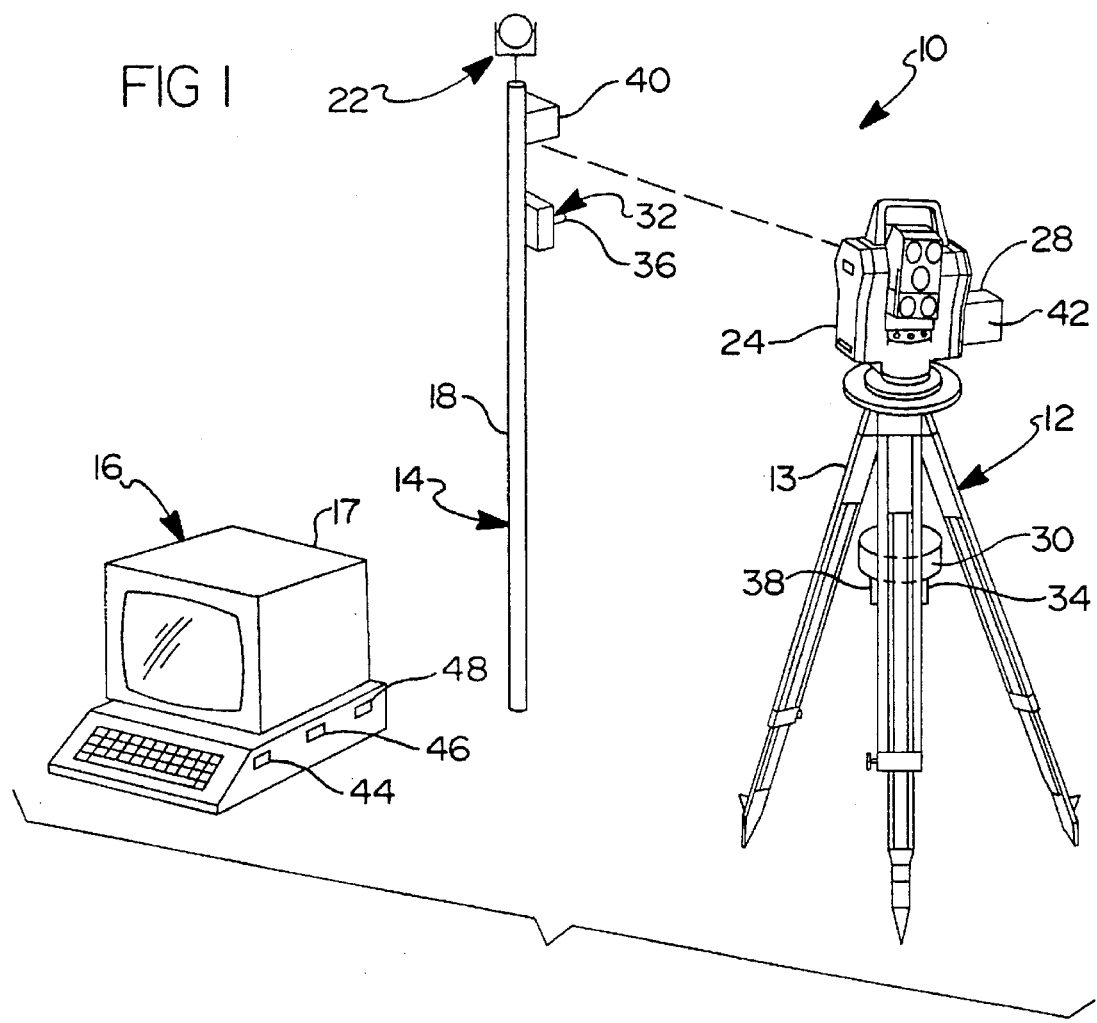
FIG. 1 is a perspective view of a preferred embodiment of the first aspect of the present invention.

FIG. 1 depicts a preferred embodiment of the three-dimensional position sensing system 10, including a reference station 12, a target station 14, and means for receiving and storing data and performing calculations thereupon 16, preferably a programmed computer 17. Means for receiving and storing data and performing calculations thereupon 16 provides means for correcting for the tilt of the target station 14 as well as means for calculating the position of the target station relative to the reference station 12. The reference station 12, the target station 14, and the programmed computer 17 are used conjointly to measure and calculate the location of points in space, whether the points represent the surface of an object or the topography of a piece of land.

The target station 14 generally includes a target pole 18, and a reflector 22 mounted to the target pole 18. Such a target station is described in U.S. Pat. No. 5,313,409 which is included herein by reference. The target pole 18 may have different configurations, which is explained herein.

The reference station 12 preferably includes a robotic transit 24 such as the Geodometer 4000 series transit produced by Geotronics, of Danderyd, Sweden which is described in U.S. Pat. No. 5,313,409. The robotic transit 24 remotely locks onto the target station 14 via a well-known detector unit which operates to recognize and determine the position of the target station 14. Such detector units are well-known in the art as described in the '409 Patent. The reference station 12 includes an output port 28 for directly or remotely linking the reference station 12 to the computer 17, which serves as the means 16 for receiving and storing data and performing calculations thereupon.

The reference station 12 includes components which generate data indicating the horizontal and vertical position of the target station 14 relative to the reference station 12, or to a separate fixed point. Additionally, the reference station 12 includes a tripod 13. Such components are well-known to the skilled artisan and are included in the Geodometer 4000 series robotic transit. Therefore, the reference station generates output indicative of the position of the target pole; however, as indicated herein above, that output is frequently inaccurate and imprecise.

A gyroscope is mounted to the reference station 12, preferably at the tripod 13. The gyroscope 30 is mounted to the tripod 13 via screws, brackets or other well-known mounting means, and is herein referred to as the reference gyroscope 30. Additionally, a target gyroscope 32 is mounted to the target station 14, preferably at the target pole 18. Alternatively, the target gyroscope 32 may be mounted to the axle of a vehicle which will be further described herein below. Means for mounting the target gyroscope 32 to the target station 14 are well known and include brackets, screws, or other such means for mounting. The reference gyroscope 30 and the target gyroscope 32 are each preferably double-plane gyroscopes such as those sold under the trade name Condor T-100 produced by Condor Pacific Industries of Westlake Village, Calif. The output of such gyroscopes is generally indicative of the rate of change of the position of the gyroscope; therefore, integrating circuitry must be included so that the gyroscopes may provide positional information. Such integrating circuits are well-known to the skilled artisan and may be purchased from Condor Pacific Industries. Both the reference gyroscope 30 and the target gyroscope 32 include an output port 34, 36 respectively, which provides each gyroscope the ability to transmit data to the programmed computer 17 via wiring, a separate radio transmitter or other transmission means well-known to the skilled artisan. The reference gyroscope 30 provides a benchmark by which the target gyroscope 32 may be calibrated, which will further be described herein.

By including the target gyroscope 32, the position sensing system 10 can make many accurate measurements in a short period of time. The target gyroscope 32 measures the tilt of the target pole 18 in both the X and Y axis, i.e. horizontally and vertically. The computer 17 can account for this tilt and alter the data received from the reference station 12 to reflect the position of the target station 14 as though the target pole 18 were not tilted. Alternatively, using simple well-known geometric and trigonometric equations and the data supplied by the target gyroscope, the computer can report the tilt of the target station 14 which is indicative of the slope of the land at the location of the target station 14. This information has many uses which will be discussed herein in greater detail. Therefore, the target station 14 does not have to be leveled every time a measurement is made by the reference station 12, saving a great deal of time. The calculations performed by the computer 17 are further described herein below.

The computer 17 may be wired to the output ports 34, 36 located on each of the gyroscopes 30, 32 and to the output port 28 located on the reference station 12. Preferably, though, one radio transmitter 38, 40, 42 is attached to each of the gyroscopes 30, 32 and to the robotic transit 24. Each of the transmitters 38, 40, 42 generate radio signals representing data which is then received at a corresponding radio receiver 44, 46, 48 connected to the computer 17 via a communications port (not shown). In this way, the computer 17 may be placed away from the equipment, dirt, and dust which could possibly damage the receivers, or the circuitry of the computer 17 itself. Such transmitters and receivers, such as the Comrad CCL901 Wireless Data Link, are well known to the skilled artisan. Each transmitter 38, 40, 42 is connected to a corresponding output port 34, 36, 28, and the receivers 44, 46, 48 are connected to the computer via a communications port such as an RS232 port. Each of the transmitters 38, 40, 42 transmits at a specific frequency so as to be received by only one corresponding receiver 44, 46, 48. In this way, there is a one-to-one correspondence between each of the transmitters 38, 40, 42 and receivers 44, 46, 48.

Alternatively, the computer 17 may be located proximate the target station. When this is the case, the radio transmitter connected to the target gyroscope is not necessary, as the computer may be electrically connected to the target gyroscope via wiring or other similar means for electrical connection. In this instance, a rugged computer must be used, one which is able to withstand a good deal of jostling about. Such rugged computers, or hardened computers, are well known.

The computer 17 is controlled via software to read data received by each of the receivers 44, 46, 48 and adjust the data, accounting for any tilt of the target station 14 which is measured by the target gyroscope 32. If the tilt of the target station 14 was not included in the calculations relating to =he position of the target station 14, the data generated by the position sensing system 10 would be inaccurate as to the horizontal and vertical position of the target station 14. The programmed computer 17 adjusts the reference station data as described in detail below.

Each transmitter 38, 40, 42 transmits data to the computer 17 via radio waves or other well-known transmission signals. The data is preferably simultaneously transmitted by each transmitter, and if not then the transmission should be almost simultaneous to ensure that the data from the target gyroscope 32 represents the rotation of the target pole 18 substantially at the moment the reference station 12 generates data regarding the relative height and distance of the target station 14. The simultaneous transmission of the three data sets is accomplished by connecting a separate transmitter 38, 40, 42 to each of the reference station 12, the reference gyroscope 30 and the target gyroscope 32 and having each transmit at least once every second and preferably 3 to 4 times a second.

The computer is preferably provided with substantially continuous information from the gyroscopes 30, 32 and from the reference station 12; however, information from the reference station 12 may be not be continuous depending upon the design of the reference station 12. If the reference station 12 does not continuously transmit data to the computer, the reference station 12 sends raw data representing the relative distance and height of the target station to the computer at a high frequency, preferably about 180–240 times a minute.

A user provides the computer 17 the height of the prism or reflector mounted to the target pole above the surface of the ground; i.e. when the target station is mounted to a vehicle. The target gyroscope 32 is preferably mounted to the target pole 18; however, the target gyroscope 32 may be mounted somewhere other than the target pole 18 as long as the target gyroscope is subjected to the same movement as the target pole.

The computer 17 must be supplied the information as to how much distance exists between the reflector 22 and the ground to accurately determine the distance the reflector 22 has moved if the target gyroscope 32 registers a certain angle of rotation either horizontally or vertically. To this end, and because the height of a vehicle body above the ground changes as the vehicle bounces up and down upon its suspension, the target pole 18 is preferably mounted to the axle of the vehicle to provide accurate measurements. Alternatively, the pole and gyroscope may be mounted to a trailer having a solid suspension. The trailer may be attached to the vehicle via a single-point hitch or some other well-known attachment means which provides rotatable attachment.

Figure 2:
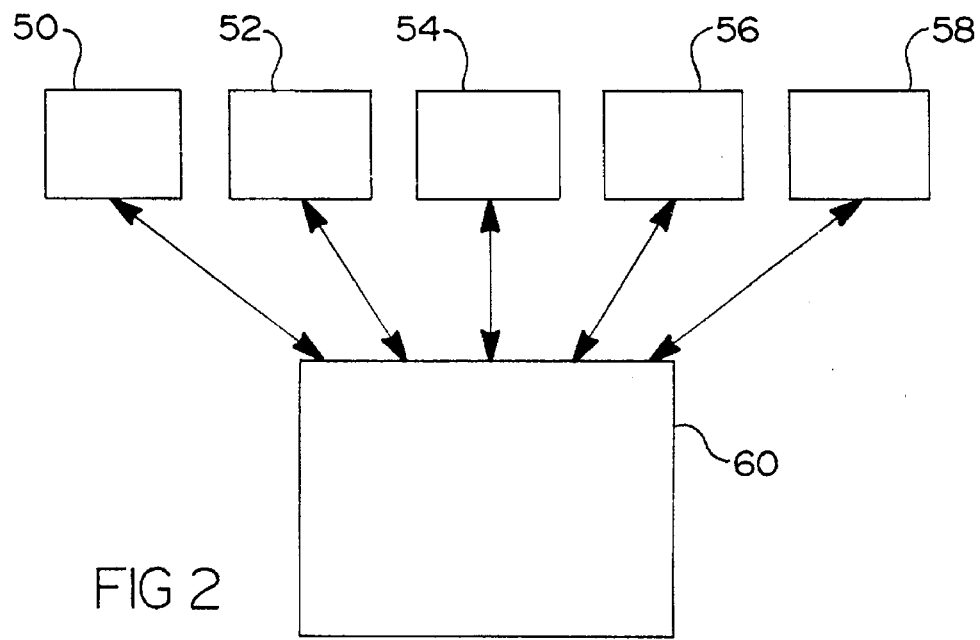
FIG. 2 is a schematic of a preferred embodiment of the means for receiving, storing, and calculating data in accordance with the present invention.

The means 16 for accurately receiving, storing and calculating data, the programmed computer 17, as depicted schematically in FIG. 2, includes a first means for storing information 50, a second means for storing information 52, a third means for storing information 54, a fourth means for storing information 56, a fifth means for storing information 58, and a means 60 for processing, namely geometrically adding or subtracting, the information contained in each of the means for storing information. The data upon which the computer 17 performs the calculations preferably represents vectors, each of which represents a direction and a magnitude. Summing such vectors requires the use of geometric and trigonometric equations. Therefore, the term "geometric summing" means summing various magnitudes adjusted for their direction, i.e. adding vectors.

Each of the first through fourth means for storing information are preferably blocks of random access memory of the computer 17; however, they may also be areas on a data storage disk, a tape drive, or other suitable storage media well known to the skilled artisan which may serve as either a temporary or permanent memory. The fifth means for storing information 58 is preferably a permanent means for storing information and is therefore preferably an area on a data storage disk, a computer data tape, or any other well known means for permanently storing information such as flash memory or the like. Alternatively, the fifth means for storing information may be a temporary memory such as the computer RAM. Because such means for storing information are well-known to the skilled artisan, they are not further described herein. Depending upon the use of the position sensing system 10, the computer 17, and its associated means for storing information 50, 52, 54, 56, 58 may be used in several different ways, each of which will be described in detail with a specific method to be implemented.

Regardless of the use of the position sensing system 10, the rotation of the Earth causes the gyroscopes 30, 32 to show a tilt for both the reference station 12 and the target station 14 as time passes. There is available a computer program under the trade name Lan Navigator produced by Condor Pacific which, when given the latitude and longitude of a point on the Earth, will correct for the rotation of the Earth at that point on its surface. However, by having a gyroscope mounted to the reference station 12, where the reference station 12 is stationary, any changes in the readings of the target gyroscope 32 due to the rotation of the Earth can be corrected by geometrically or vectorally subtracting the readings of the reference gyroscope 30 from the readings of the target gyroscope 32. This is essentially the role of the reference gyroscope 30, as the reference station 12 is generally held stationary. Therefore, no matter how the position sensing system 10 is to be employed, this calculation must take place, either by geometrically subtracting the reference gyroscope 30 data from the target gyroscope 32 data, or by using the commercially available computer program to account for the drift of the target gyroscope 32 caused by the rotation of the Earth. Therefore, the reference gyroscope 30 is not absolutely essential to the functioning of the present invention; however, its use does provide the best mode for carrying out the invention, as a user will not have to run a separate program, or know the latitude and longitude of the position of the reference station 12 on the surface of the Earth. Additionally, it is to be appreciated that by adding a magnetic compass, such as that produced by Condor Pacific Inc., to each gyroscope the drift of the gyroscopes may be corrected utilizing the true North measurement. However, as there is frequently machinery used which incorporates the use of magnets, the readings from the compass may be somewhat inaccurate and, as such, the magnetic compass is not included in the preferred embodiment.

Alternatively, it is to be appreciated that although gyroscopes are the preferred means for measuring the tilt of both the target pole and the reference station, inclinometers, such as the Warren Knight Model No. 23-3000, will serve the same function. The major drawbacks to using such inclinometers are the rate at which they measure changes in tilt or rotation and the maximum angle of tilt they can measure, which is roughly forty-five degrees. Therefore, it is possible to use inclinometers in an embodiment of the present invention, although not preferable.

Once the readings of the target gyroscope 32 mounted to the target station 14 have been adjusted to remove the rotation of the Earth, the data generated by the reference station 12 can be corrected for any tilting of the target station 14. As the target pole 18 of the target station 14 is moved along, it tends to tilt. This tilt will tend to cause the reference station 12 to generate inaccurate results. If the target pole 18 is tilted then the reference station 12 will generate an inaccurate result as to the position of the target station 14. In essence, the reference station 12 will indicate that the target station 14 is too close or far away, as well as too far right or left because of the tilt of the target pole 18. This is because standard surveying assumes there is a 0° angle of rotation of the target pole 18 about a reference point. Rotation of the target pole changes the angle and therefore corrupts the notion that the measured point is directly below the prism or reflector, because it is not. By incorporating the measurements of the target gyroscope 32, the reference station 12 readings can be corrected for just such error. Such means for correcting for the tilt of the target station 14 are described further herein below.

Because it is preferable to have the computer 17 reading the data from each of the gyroscopes 30, 32 and the reference station 12 simultaneously, three receivers 44, 46, 48 must be connected to communications ports on the computer 17. Each of the three communications ports are monitored by the computer 17 which preferably is running a multi-tasking operating system, such as that supplied under the trade name OS2 marketed by International Business Machines. Data from the reference gyroscope 30 is received by a first receiver 44 and stored in the first means for storing information 50. Data from the target gyroscope 32 is received by the second receiver 46 and stored in the second means for storing information 52. Data from the reference station 12 is received by the third receiver 48 and stored in the third means for storing information 54. Depending upon what the position sensing system 10 is being used for, the data may remain in storage and the necessary calculations performed at a later time, or the calculations may be performed substantially at the time the data is received. For example, if the position sensing system 10 is being used to survey a piece of land, then the calculations do not have to be performed at the time the surveying is taking place. Therefore, the system is in "data taking" mode, where data is stored and the calculations are performed when the surveying is completed. By delaying the calculating step, data may be gathered more quickly and with greater frequency because computer time may be spent collecting data and not calculating positions. In order to ensure that the correct calculations occur at a later time, the computer 17 must be supplied with an internal clock. Internal computer clocks are well-known to the skilled artisan. As each piece of data is read into the computer 17, the time that the data was read in must also be stored along with the data in the respective means for storing data. This "time stamp" then ensures that data from the reference gyroscope 30, the reference station 12 and the target gyroscope 32 were all generated at substantially the same time, which in turn ensures that correct calculations are made. For example, one would not want to perform any calculations using data taken from the reference station 12 at 1:00p.m. with data taken from the target station 14 taken at 1:03p.m. A small amount of error, however, may be acceptable. The table below lists the approximate acceptable differences in time (A) between measurements of the target gyroscope 32, the reference gyroscope 30, and the transit:

| Measuring device | Time the Measurement is Taken |
| --- | --- |
| Reference gyroscope | A + or − 2 minutes |
| Target gyroscope | A + or − .2 seconds |
| Transit | A |

If the position sensing system 10 is being used where immediate calculation is necessary, i.e. to direct earth grading machinery, then each piece of data is read into the appropriate means for storing information and immediately the calculations take place. The calculations are listed herein below and are the same for each of the implementations of the position sensing system. If immediate calculation is not necessary, then the stored data can have the calculations performed at a later time. In that case, each of the means for storing information are preferably permanent in nature, such as a hard disk, tape drive or the like.

Each of the aspects of the present invention include both the means for correcting for tilt of the target station 14 and the means for calculating the position of the target station 14. These are implemented as software on the computer 17 and as such their general function is herein described so as to provide a skilled computer programmer the requisite information to write a computer program that accomplishes the functions.

The processor 60 searches through the list of time stamps for three pieces of data necessary to carry out a calculation. The processor 60 will sequentially select data from the group of data generated by the transit 24, from the third means for storing information 54, as indicated by its time stamp. It will then search for the closest time stamps from the sets of data generated by the reference gyroscope 30 and the target gyroscope 32 which are stored in the first means for storing information 52 and the second means for storing information 54. If the closest time stamps located in the data sets from the target gyroscope 32 and the reference gyroscope 30 fall outside of the allowable ranges as set forth above, then the processor 60 will automatically purge the piece of data from the data set generated by the reference station 12, and stored in the third means for storing information 54. The processor 60 will move on to the next piece of data, stored in the third means for storing information 54, once again searching the time stamps of the other two data sets, searching for those time stamps closest to the one associated therewith.

Once data has been located from the first, second, and third means for storing information 50, 52, 54, where the time stamps are within the prescribed ranges set out above, and before any other calculations take place, the position vector of the reference gyroscope 30 is subtracted from the position vector of the target gyroscope 32. Subtracting one vector from another is well known to the skilled artisan and can be found in any trigonometry textbook.

It is to be remembered that the gyroscopes are not measuring the actual position of the target and reference stations, but rather the change in magnitude and direction of their relative position. The reference gyroscope 30 essentially measures the rotation of the Earth which will be substantially the same at both the target station 14 and at the reference station 12. Therefore, the position vector of the reference station 12 as indicated by the reference gyroscope 30 is subtracted from the position vector of the target gyroscope 32 to leave the true rotation of the target station 14 due to any tilt of the target pole 18 or implement upon which both the target pole 18 and the target gyroscope 32 are mounted, and not due to the rotation of the Earth. Now, the "untilted" position of the target station 14, and the reflector 22 mounted thereupon, must be calculated. Where x', y' and z' represent the position of the reflector 22 when the target pole 18 is tilted, the untilted position of the reflector would be:

$$x = x' - \sin(B) * (\sin(A) * L)$$

$$y = y' - \cos(90 - B) * (\sin(A) * L)$$

$$z = z' - \cos(A) * L$$

where L is the distance of the reflector on the target pole to the ground. "A" is the tilt angle of the target gyroscope 32 about the y-axis. "B" is the rotation angle of the target gyroscope 32 about the x-axis. Once the processor 60 makes these calculations, the true position of the target station 14 is known and has been adjusted for the tilt of the target pole 18. Depending upon the specific use of the position sensing system 10, the data thereby generated may be stored, used to reposition a piece of Earth-grading machinery, or used for another such purpose, several of which are described herein below. This system can generate many data points very rapidly, as only one person needs to be positioning the target, and the reference station 12 automatically follows the motion of the target station 14 because it includes the robotic transit. This first aspect of the present invention, namely the position sensing system, is included in each of the other aspects of the present invention, and as such will not be described herein again.

Figure 3:
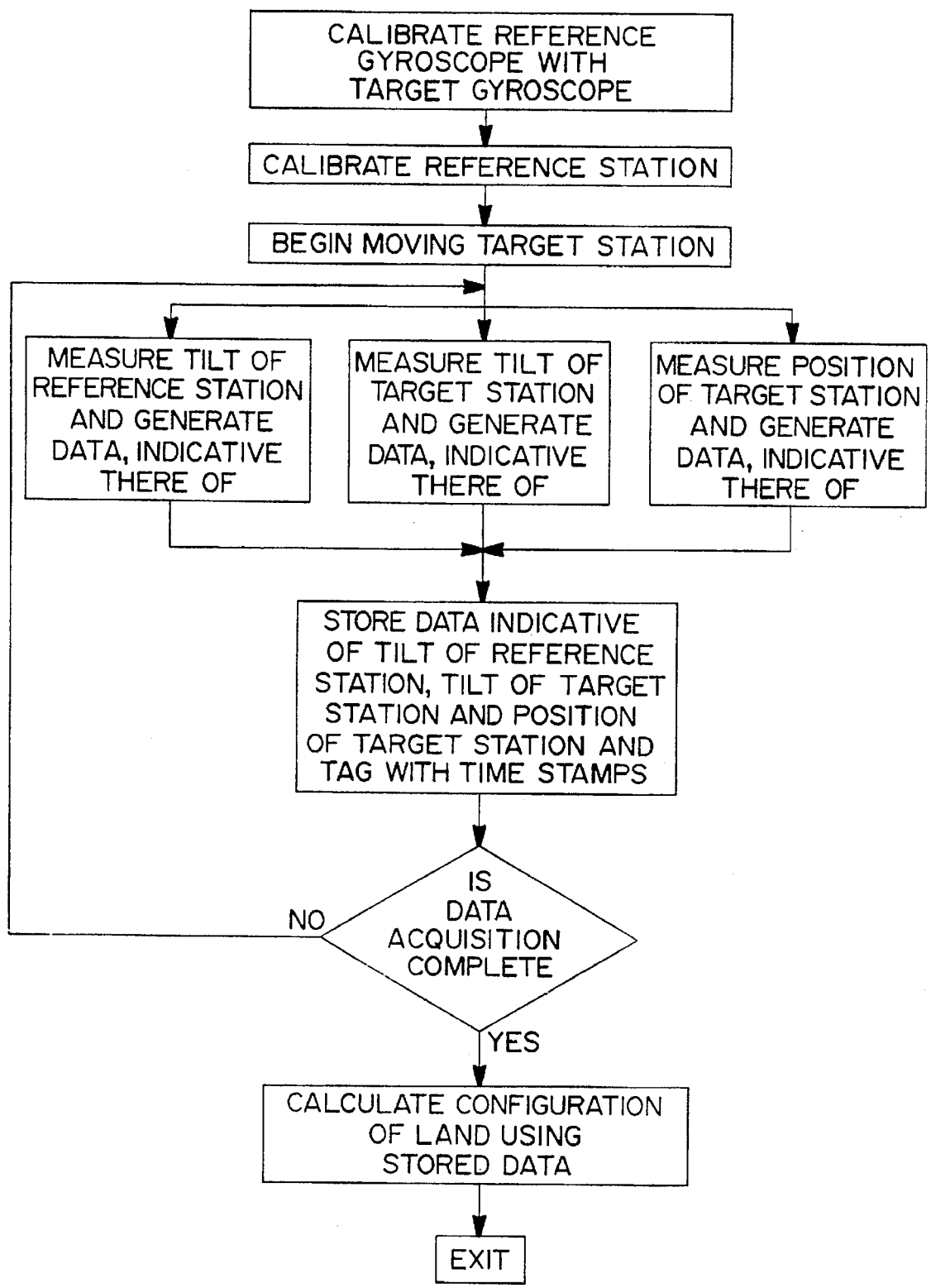
FIG. 3 is a flow diagram of a preferred embodiment of the method for surveying a piece of land, the second aspect of the present invention.

The present invention includes a second aspect, namely a method for quickly and accurately surveying a piece of land. The position sensing system 10 is used to survey a piece of land. The steps included in the method for surveying a piece of land are depicted in FIG. 3. First, the reference gyroscope 30 and the target gyroscope 32 are calibrated. This is accomplished by leveling the reference station 12 and the target station 14 and setting each of the gyroscopes attached thereto to a reading of zero.

Secondly, the reference station 12 is calibrated. This requires a user to provide the reference station 12 with the reflector's 22 height above the surface of the Earth. Calibrating the reference station 12, or more particularly the robotic transit, is well-known by those skilled in the art. In step 3, the user begins moving the target station 14. The reference station 12 begins tracking the target station 14 as it is moved along the ground. The target station 14 does not have to be in direct contact with the ground. It may be mounted to a vehicle, such as a truck, car, or bicycle, which rides along the ground, via a mounting bracket, screws or the like. If the target station 14 is mounted to a vehicle, then the reference station 12 must be calibrated to account for the height of the vehicle upon which the target station 14 is mounted, which once again is included in step 2. If the target station 14 is mounted to a vehicle, it is preferably mounted to a component of the vehicle which will not oscillate with the suspension system of the vehicle. An axle would provide just such a place for attachment.

In step 3, as the target station 14 is moved, the reference station 12 tracks the target station 14 and takes discrete measurements of the relative height and distance of the target station 14, or more specifically the height and distance of the reflector 22 which is mounted to the target pole 18, relative to the reference station 12. The reference station 12 includes the robotic transit which provides the reference station 12 its automatic tracking capabilities.

Step four includes the simultaneous, or near simultaneous generation and transmission of data by the reference station 12, the target gyroscope 32 and the reference gyroscope 30. The data is transmitted from each radio transmitter 38, 40, 42 to a corresponding receiver 44, 46, 48 at the computer 17. In step 5, all of the data is stored in the respective means for storing information 50, 52, 54 along with data indicating the time the piece of data was received, i.e. a time stamp. Therefore, each means for storing information 50, 52, 54 stores the information received at a receiver 44, 46, 48 along with an associated time stamp.

The computer 17 can regulate the frequency with which data is stored depending upon the needs of the user. For example, if the target station is mounted to a car which is driving along, the computer 17 can be set to store data received at each receiver 44, 46, 48 three times per second. If a person is carrying the target station 14 the computer 17 can be set to store data every ten seconds. The rate of data acquisition is limited only by the amount of space or memory available in each of the means for storing the information and the precision required for the job being done, i.e. the more data collected, the more precise the survey. Steps three and four continue until all necessary data points have been generated and stored.

Step five is essentially generating the final data which represents the "untilted" position of the target station 14. The means for processing the stored information 60, preferably a high speed CPU such as a Pentium processor or a 486DX processor produced by Intel, then performs the above-referenced calculations to transform the data generated by the reference station 12 into data which is substantially accurate, i.e. any tilt of target station is removed from calculations. Essentially, any processor may be used to carry out the above-referenced calculations and reference to any specific processor is provided as an example and not a limitation. Any type of processor which can carry out the necessary calculations may be used.

As was mentioned above, step six may take place as the surveying takes place, or it may be conducted at a later time. If the calculations are done while data is being collected, the computer CPU time available to store data will be lessened, therefore reducing the amount of data that can be collected in a finite period. When the "data acquisition" phase is complete, a user can indicate such to the computer 17 by pressing a predetermined key on the keyboard (not shown). At that point, the processor 60 begins the task of searching through the data and performing the calculations.

In processing the data, the processor 60 first reads in from the third means for storing information 54, the time stamp and the data associated therewith which was received from the reference station 12. The processor 60 then searches through the first and second means for storing information 50 and 52, locating the time stamps which are chronologically closest to the time stamp which was read in from the third means for storing information 54. The processor 60 locates these time stamps and reads in the data associated with each of the time stamps. It is to be appreciated that the data stored in each of the means for storing information may be stored as an array, linked list, or the like, and that any type of well-known sorting algorithm may be used, such as a bubble sort or a quick sort.

The processor 60 then compares the times at which the data were received at the computer 17 as indicated by the time stamps. If the time a given datum was received falls outside the prescribed range described herein, then the processor 60 purges the time stamp and the associated data from the third means for storing information 54, and reads in the next time stamp and associated data therefrom.

Once the processor 60 locates time stamps from the first means for storing information 50, the second means for storing information 52 and the third means for storing information 54, which are within the prescribed ranges, the processor then vectorally subtracts the corresponding reference gyroscope data from the target gyroscope data.

The processor 60 then calculates the untilted position of the target station 12 as set out above. The data indicating the untilted position of the target station are then stored in the fourth means for storing information 56. If there are more data in the third means for storing information 54, the processor repeats the above steps from the point where it reads in the next set of data from the third means. The processor 60 continues until all data in the third means for storing information 54 have been processed. Each of the above-described processing steps may be implemented as a portion of a computer program implemented on the computer 17. Alternatively, the procedures may be constructed as hard-wired circuitry. Both embodiments will function; however, the use of a computer is preferable for its ease of implementation. A skilled computer programmer should have no problem writing a computer program to accomplish the above-described steps, and should be able to accomplish such without undue experimentation.

Figure 4:
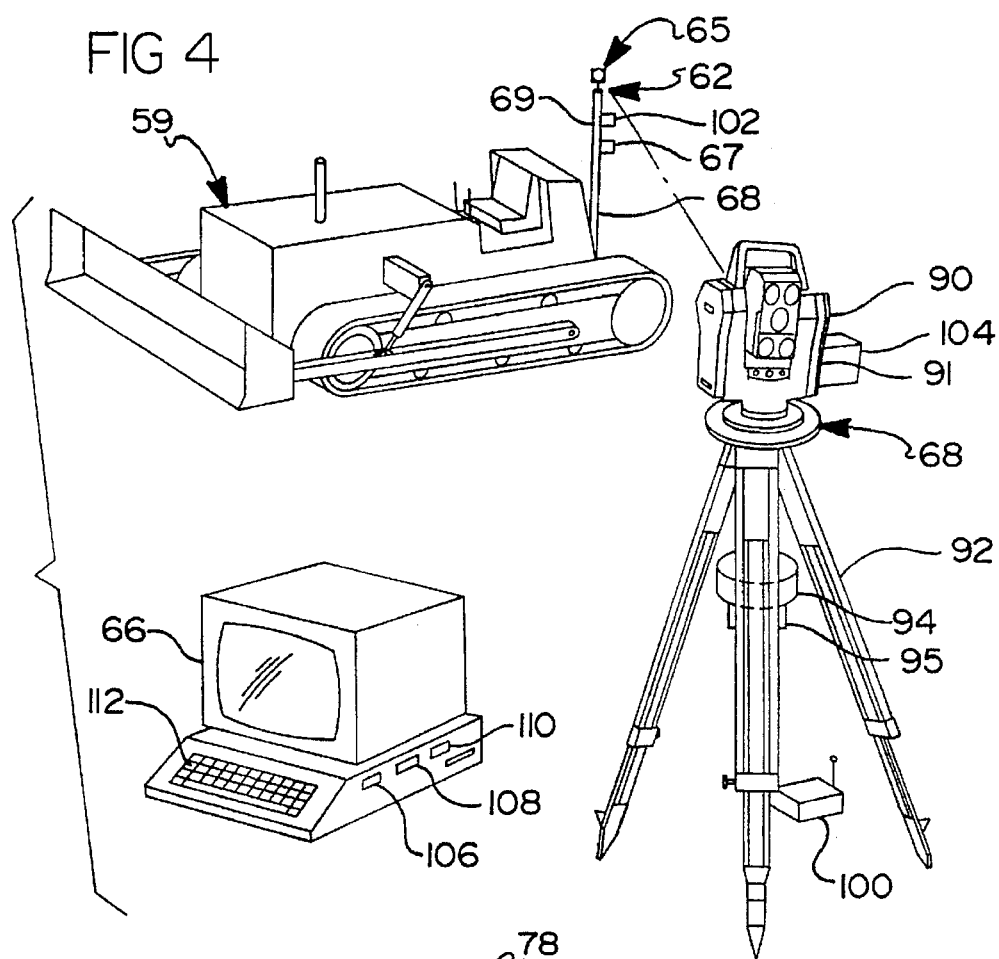
FIG. 4 is a perspective view of a preferred embodiment of the grading implement position sensing and guidance system and method of the present invention.

The present invention additionally presents a third aspect, namely a grading implement sensing and positioning method and apparatus. In this third aspect, the position sensing system of the present invention is utilized in conjunction with Earth grading machinery such as bulldozers, scrapers, etc. The apparatus of the preferred embodiment of the third aspect of the present invention is depicted in FIG. 4. A target station 62 is mounted to a piece of Earth grading equipment 59. The target station 62 includes a target pole 63 and a reflector 65. A target gyroscope 67 having an output port 69 is attached to either the target pole 63 or the earth moving machine 59. The reference station 68 includes a robotic transit 90 having an output port 91, a tripod 92, and a reference gyroscope 94 which is mounted to the tripod 92 via screws, nuts and blots, or other well known mounting means. The reference gyroscope 94 includes an output port 95 for outputting signals indicative of the rotation of the reference gyroscope 94.

A first radio transmitter 100 is preferably electrically connected to the output port 95 of the reference gyroscope 94. A second radio transmitter 102 is preferably electrically connected to the output port 69 of the target gyroscope 67. A third radio transmitter 104 is connected to the output port 91 of the robotic transit.

As described herein above with reference to the position sensing system depicted generally in FIG. 4, each of the radio transmitters is in communication with a corresponding radio receiver. The first radio transmitter 100 is in communication with a first receiver 106. The second radio transmitter 102 is in communication with a second receiver 108. The third radio transmitter 104 is in communication with a third receiver 110. Each of the receivers is connected to the communications port (not shown) of a computer 66. The computer 66 includes each of the elements depicted in FIG. 2. The computer 66 is used in conjunction with the target station 62 and the reference station 68 to calculate the position of the Earth grading equipment 59.

Figure 5:
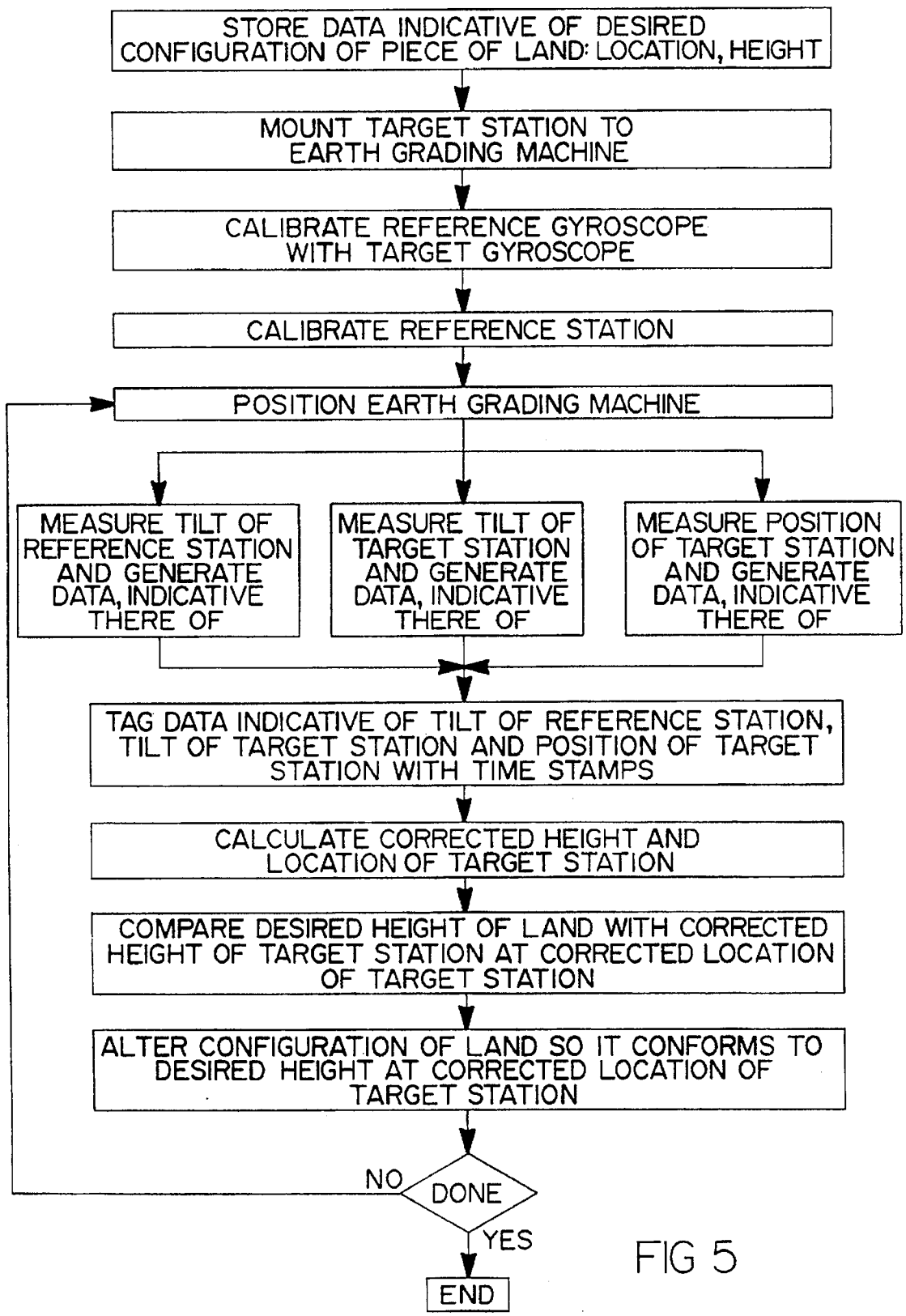
FIG. 5 is a flow diagram of the grading implement position sensing and guidance system and method, the third aspect of the present invention.

The grading implement sensing and positioning method using the apparatus depicted in FIGS. 2 and 4 is depicted in the flow chart of FIG. 5. First, a set of data representing the desired grade of a plat of land to be graded is entered into the fifth means for storing information 58. The information may be stored as sets of three elements, where the first element represents distance from a benchmark (i.e. an arbitrary fixed point), the second element represents the angle of rotation from the benchmark, and the last element represents the height above or below the benchmark. Alternatively, the data may represent an X-axis value, a Y-axis value, and a Z-axis value, which is another coordinate measuring system. Both systems will work, and either may be implemented to match the coordinate system utilized by the reference station 68 in generating data. Additionally, this data is preferably in the same coordinate system as that used in storing information received from the reference station 68, except that the information from the reference station 68 will have a fourth element, a time stamp, associated therewith.

The data representing the desired grade of the land may be generated in several ways. It may be calculated manually and entered into the computer 66 via the keyboard 112 or other well-known device for inputting data into a computer. Alternatively, a contour map may be drafted and then scanned into the computer's memory which can then convert the map into the sets of coordinates and heights. Other means for generating data representing location and height data are well known to the skilled artisan.

Second, the target station 62 is mounted to an Earth grading machine 59. Means for mounting the target station 62 to an Earth grading machine 59 include screws, brackets or other similar well-known mounting means. Third, the reference gyroscope 94 and the target gyroscope 67 are calibrated just as they are calibrated in the land surveying method, which was described herein above. Fourth, the reference station 68 is calibrated to account for the initial height of the target station 62 above the surface of the Earth. Once again, this procedure was substantially detailed above with respect to the method for surveying a tract of land. However, in this case the target station 62 is mounted to an Earth grading machine.

The fifth step involves positioning the Earth-grading machine 59 at some point on the tract of land (not shown) to be graded. An operator of the Earth grading machine may physically drive the machine to an area on the tract of land. Alternatively, the earth-grading machine may be remotely controlled via either an operator or a control system. The control system may be integrated into the position sensing system which is the first aspect of the present invention. Such a control system may integrally function with the position sensing system by incorporating it into the computer program which preferably carries out the position sensing calculations. Many remote control systems already exist and could be incorporated into the present invention.

The sixth step is identical to step three of the land surveying method, namely generate three separate data sets indicative of the tilt of the reference station 68, tilt of the target station 62, and position of the target station 62. The steps necessary to accomplish this were described herein above.

The next step, step seven, is tagging each piece of data with a time stamp. This is accomplished as set out before in the land surveying method. The processor generates an indication of the time each piece of data was received, and attaches or associates the time with the data. This may be accomplished by using records and linked lists, both of which are well-known programming techniques for storing data in a computer's memory.

Once each piece of data has been tagged with a time stamp, the position of the Earth-grading machine is calculated, step 8. The steps involved in this calculation were set out above in relation to both the position sensing system and the land surveying method.

The ninth step involves reading the data stored in the fifth means for storing information into memory, most commonly referred to as RAM. The data list is preferably organized as a linked-list of records, wherein each record contains each of the elements of the set of data, i.e. distance, angle of rotation and height, or X, Y, Z elements. The data may additionally be stored as an array or any other well-known abstract data structure well suited for sorting and traversal thereof. If the data representing the desired grade of the land was earlier entered into the computer, it is preferable to save the data to a permanent data storage device such a disk drive, tape back-up, etc. It is to be appreciated that any data which is permanently stored will not be destroyed if the computer is shut off. If the data is located on a permanent storage medium, it must then be read into the computer's memory and formatted, so as to be searched. This is a well-known programming technique (i.e., loading information into a record or linked list through the use of a computer program written in one of many programming languages including Pascal, C++, Lisp, etc.) and as such will not be further described herein.

The processor of the computer 66 then searches the data list stored in the fifth means for storing information 58 to locate positional data which matches the current position of the Earth grading equipment. The processor only searches the distance and angle of rotation elements, or the X, Y elements, as the height of the land at the particular location is what is to be altered. The processor may utilize a bubble sort, a quick sort, or any other sorting algorithm well-suited to traverse a set of records or a linked-list.

Once the processor has found a match between the current position of the earth grading equipment and data indicative of substantially the same position stored in the fifth means for storing information 58, the operator of the Earth grading machine may be instructed to either add earth at that location or remove earth, depending upon the height of the land as currently measured compared to the desired height of the land. The message may be sent automatically by the processor 60 to a remote screen (not shown) located in the cab of the earth moving machinery via radio transmitters such as those described previously. Alternatively, a computer operator upon seeing the difference in current height compared to desired height may contact the operator of the machine via radio or the like, and inform him as to how much earth to add or remove. Additionally, the processor 60 may be provided the means to directly control the Earth-grading machine and thus carry out the task of adding or removing dirt without any human involvement. The Earth moving machine can then be moved to a new location where the process repeats until the land is in conformity with the desired grade.

This method will work with several earth moving machines wherein a reference station is provided for each machine. The system will function with one computer 17 having a number of radio receivers corresponding to the number of gyroscopes and reference stations being used; however, it is preferable to have one computer for each position sensing system utilized, as this will allow more rapid grading of the land.

Figure 6:
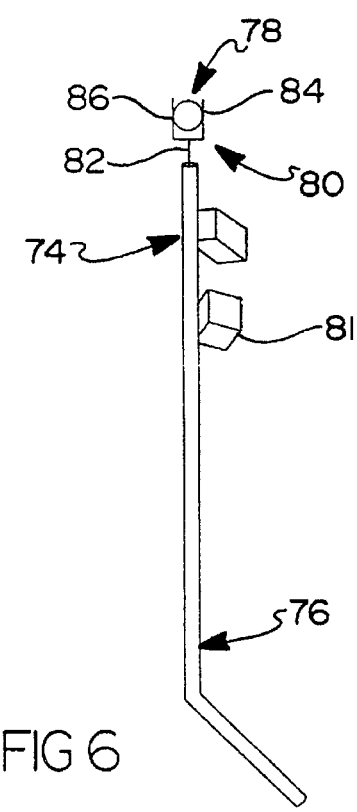
FIG. 6 is a view of the target station of the coordinate measuring apparatus, the fourth aspect of the present invention.

A fourth aspect of the present invention is a coordinate system measuring apparatus, an embodiment of which is depicted in FIG. 6. Many times one desires to survey an object and not a tract of land. The methodology utilized in obtaining data is the same as that for surveying a tract of land; however, the target station configuration is different. The coordinate measuring apparatus of the fourth aspect of the present invention includes a specially configured target pole 74. Because the target pole 74 will have to be placed around corners, the pole 74 is bent towards its lower end 76. The processor is given the relationship between the location of the lower end 76 of the target pole 74 and the reflective element 78 mounted thereto. This relationship is easily represented mathematically by indicating that the lower end of the pole is always in a positional relationship with the location of the reflector. The pole 74 still has a target gyroscope 81 mounted thereto as well. In this way, the location of the lower tip of the pole can be determined as it is placed around corners, etc. The reflective element 78 is located on the target pole such that it will generally be within sight of the reference station.

The reflector 78 of the target pole 74 of the fourth aspect of the present invention is mounted to the target pole 74 via a rotatable wishbone mounting assembly 80. The assembly 80 includes a stem 82 which is rotatably mounted to the target pole, preferably at its top end. The assembly 80 may be rotated 360° about the axis of the stem. The assembly additionally includes two branches 84, 86. The reflective element 78 is rotatably mounted between each of the branches 84, 86. The reflective element 78 rotates normal to the rotation of the assembly 80. In this way, an operator can manually align the reflective element 78 to point back to the reference station no matter how the target pole must be turned to measure an object.

Alternatively, means for automatically pointing the reflector back at the reference station may be included in the assembly 80. Electromechanical motors turn the assembly 80 towards the reference station by automatically calculating the "back angle" of the station. The back angle is 180° minus the location measured by the reference station. A small microprocessor can be connected to the assembly 80 to turn the assembly to always face the reference station.

In all of the herein-described aspects of the present invention, each of the gyroscopes will tend to drift a small amount over a given period of time, the amount of drift depends upon the gyroscope selected for inclusion in the system 10. It is therefore advisable to occasionally recalibrate the gyroscopes at least once an hour to ensure accurate readings. Alternatively, two additional reflectors may be mounted to the target pole which would allow the system to be calibrated without having to relevel the target station and the reference station; however, this would increase the cost of the system and would not save very much time. Therefore, it is not the preferred method for recalibrating the gyroscopes. Additionally, it is to be appreciated that two transits may be used to measure the location of two targets which are statically held a specified distance from one another, i.e, one target at each end of the target pole. The measurements of the two transits can then be compared and the true location of the target calculated via a computer or other means for data processing using well-known trigonometric and geometric equations. Because of the high cost of transits, such a system is not presented as the preferred embodiment.

In a modification of the preferred embodiment of each of the aspects of the present invention, a gyroscope is mounted at the bottom of the target pole. If the correct pole length to pole weight ratio is achieved, the gyroscope will always maintain the pole in a vertical orientation. In this modified embodiment, a single axis gyroscope is used. This gyroscope would be far more massive than the previously disclosed gyroscopes. It would be sized to gyroscopically stabilize the target pole.

The gyroscope may be set at the bottom of the target pole or just thereabove, to maintain the pole in a vertical orientation. Essentially, the gyroscope vertically stabilizes the target pole. It is well-known to use gyroscopes to stabilize the movement of vehicles and the like. Of course, the rotation of the Earth would have to be accounted for in this system by resetting the gyroscope at periodic intervals, or by using a computer program to correct for such a measurement. This would reduce the calculations required; however, some error might still occur as a vehicle to which the pole is mounted bounces along. This is therefore not the preferred embodiment.

In another modified embodiment of the present invention, one which has special applicability to waterbound vessels such as ships, a transit or reference station is rotatably mounted to the ship and further includes a three axis gyroscope. Several target stations are placed on shore, each having a two axis gyroscope mounted thereto. In this way, the location of the ship can always be known by employing the same position sensing methodology described herein; however, the target stations are unmoving in this instance, while the reference station moves with the ship. In this way, the location of the ship with respect to the shoreline can always be known, reducing the chances of grounding the ship.

The present invention has many advantages over the devices of the prior art. It provides for rapid data acquisition, as the target station can be mounted to a motorized vehicle which is driven over the land. It provides substantial improvement in the accuracy and precision of data collected, as the gyroscopes used in the system provide extremely precise information as to the tilt of the target station. Additionally, the present invention may be used in a variety of contexts, such as land surveying, coordinate measuring, and Earth grading machinery position sensing.

While the invention has been illustrated and described in detail in the drawings and the foregoing description, the same is to be considered as illustrative and not restrictive in character, it being understood that only the preferred embodiment has been shown and described fully and that all changes and modifications that come within the spirit of the invention are desired to be protected.

Having thus described the invention, what is claimed is:

1. A system for three-dimensional position sensing comprising:
   (a) at least one target station comprising means for transmitting data;
   (b) at least one reference station comprising:
      (1) means for measuring the distance of the at least one target station from the at least one reference station to obtain a distance measurement;
      (2) means for measuring the height of the at least one target station relative to the height of the at least one reference station to obtain a height measurement;
      (3) means for measuring the azimuth angle of the at least one target station to obtain an azimuth angle measurement; and
      (4) means for transmitting the distance measurement, the height measurement, and the azimuth angle measurement to a means for correcting for tilt;
   (c) means for defining a floating point;
   (d) means for measuring rotation of the at least one target station about the floating point;
   (e) means for correcting for tilt of the target station in response to the measurements received from the means for transmitting; and
   wherein the target station measurements received by the means for correcting for tilt of the target station are stored therein;
   further wherein data containing measurements taken by the means for measuring rotation of the at least one target station about the floating point are transmitted to the means for correcting for tilt of the target station and further are stored therein; and
   wherein measurements taken by the means for measuring the distance of the at least one target station from the at least one reference station, the means for measuring the height of the at least one target station relative to the height of the at least one reference station, and the means for measuring the azimuth angle of the at least one target station are adjusted by the means for correcting for tilt of the target station according to measurements taken by the means for measuring the rotation of the at least one target station about the floating point.

2. The system of claim 1 wherein the at least one reference station comprises a robotic transit.

3. The system of claim 1 wherein the means for measuring rotation of the at least one target station about a floating point comprises a gyroscope.

4. The system of claim 3 wherein the gyroscope is a dual-axis gyroscope.

5. The system of claim 1 wherein the means for correcting for tilt of the target station comprises:
   a first means for storing information;
   a second means for storing information;
   a third means for storing information;
   means for processing information stored in the first means for storing information, the second means for storing information and the third means for storing information;
   a fourth means for storing information which has been processed by the means for processing information.

6. The system of claim 1 wherein the target station comprises:
   a target pole; and
   a reflector mounted to the target pole.

7. The system of claim 1 further including a gyroscope mounted to the at least one reference station.

8. The system of claim 1 wherein:
   the at least one target station comprises a plurality of target stations;
   the at least one reference station comprises a plurality of reference stations corresponding to the plurality of target stations.

9. The system of claim 5 wherein the means for processing information includes means for performing vectoral addition and substraction.

10. The system of claim 6 wherein the target pole comprises:
    a top portion;
    a bottom portion; and
    wherein the top portion and bottom portion are formed at an acute angle relative to one another.

11. The system of claim 10 wherein the reflector is mounted to the top portion of the target pole.

12. The system of claim 3 wherein the means for correcting for tilt of the target station comprises:
    a first means for storing information;
    a second means for storing information;
    a third means for storing information;
    means for processing information stored in the first means for storing information, the second means for storing information and the third means for storing information;
    a fourth means for storing information which has been processed by the means for processing.

13. The system of claim 5 further including a gyroscope mounted to the at least one reference station.

14. A system for three-dimensional position sensing comprising:
    at least one target station;
    at least one reference station comprising:
       means for measuring the distance of the at least one target station from the at least one reference station;
       means for measuring the height of the at least one target station relative to the height of the at least one reference station;
       means for measuring the azimuth angle of the at least one target station;
    means for defining a floating point;
    means for measuring rotation of the at least one target station about the floating point;
    means for correcting for tilt of the target station comprising:
       a first means for storing information;
       a second means for storing information;
       a third means for storing information;
       means for processing information stored in the first means for storing information, the second means for storing information and the third means for storing information;
    a fourth means for storing information which has been processed by the means for processing;
    means for storing information indicative of a desired configuration of a tract of land;
    means for comparing the information stored in the fourth means for storing information with information stored in the means for storing information indicative of a desired configuration of a plat of land;

wherein measurements taken by the means for measuring the distance of the at least one target station from the at least one reference station, the means for measuring the height of the at least one target station relative to the height of the at least one reference station, and the means for measuring the azimuth angle of the at least one target station are adjusted by the means for correcting for tilt of the target station according to measurements taken by the means for measuring the rotation of the at least one target station about the floating point.

15. A method for using the position sensing system of claim 1 to survey a tract of land, the method comprising:

(1) calibrating the reference gyroscope with the target gyroscope;

(2) calibrating the reference station;

(3) moving the target station;

(4) measuring the tilt of the reference station, the tilt of the target station, and the position of the target station and generating data indicative thereof;

(5) generating time stamps;

(6) storing data indicative of tilt of reference station, tilt of target station, and position of target station and tag with a time stamp; and (7) calculating configuration of land.

16. A method for using the position sensing system of claim 1 to sense the position of and direct a grading implement, the method comprising:

storing data indicative of the desired configuration of a tract of land in the means for receiving, storing and processing information;

mounting the target station to the grading implement;

calibrating the reference gyroscope with the target gyroscope;

calibrating the reference station;

positioning the grading implement;

measuring the tilt of the reference station, the tilt of the target station, and the position of the target station and generate data indicative thereof;

tagging data indicative of tilt of reference station, tilt of target station and position of target station with a corresponding time stamp;

calculating the height and location of target station;

comparing the desired configuration with height of target station at location of target station; and altering the configuration of land until it conforms to desired height at location of target station.

17. The system of claim 6 wherein the target station is mounted to a grading implement.

18. The system of claim 1 wherein the means for defining a floating point and the means for measuring rotation of the at least one target station about the floating point comprises an inclinometer.

19. The system of claim 1 wherein the at least one reference station is mounted to a ship.

20. The system of claim 7 wherein the gyroscope is a dual-axis gyroscope.

* * * * *